United States Patent
Alkhalaf et al.

(10) Patent No.: US 11,608,467 B2
(45) Date of Patent: *Mar. 21, 2023

(54) HYDRAULIC FRACTURING FLUIDS WITH AN AQUEOUS BASE FLUID AND CLAY STABILIZER AND METHODS FOR HYDRAULIC FRACTURING USING THE SAME

(71) Applicant: Saudi Arabian Oil Company, Dhahran (SA)

(72) Inventors: Sara A. Alkhalaf, Alkhobar (SA); Bader Ghazi Alharbi, Dammam (SA); Abdullah S. Al-Yami, Dhahran (SA); Ali M. Safran, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/176,434

(22) Filed: Feb. 16, 2021

(65) Prior Publication Data
US 2022/0259486 A1  Aug. 18, 2022

(51) Int. Cl.
*E21B 43/16* (2006.01)
*C09K 8/60* (2006.01)
(Continued)

(52) U.S. Cl.
CPC .............. *C09K 8/608* (2013.01); *C09K 8/685* (2013.01); *E21B 43/16* (2013.01); *E21B 43/26* (2013.01); *C09K 2208/12* (2013.01)

(58) Field of Classification Search
CPC .... C09K 8/608; C09K 8/685; C09K 2208/12; E21B 43/26
See application file for complete search history.

(56) References Cited

U.S. PATENT DOCUMENTS 2,761,843 A   9/1956   Brown
2,873,251 A   2/1959   Jones, Jr.
(Continued)

FOREIGN PATENT DOCUMENTS

WO   2014123709 A1   8/2014
WO   2014200671 A2   12/2014
WO   2015031270 A1   3/2015

OTHER PUBLICATIONS

U.S. Office Action dated Feb. 1, 2022 pertaining to U.S. Appl. No. 17/176,453, filed Feb. 16, 2021, 17 pages.
(Continued)

*Primary Examiner* — Silvana C Runyan
(74) *Attorney, Agent, or Firm* — Dinsmore & Shohl LLP

(57) ABSTRACT

According to one or more embodiments of the present disclosure, a method for hydraulic fracturing includes pumping a hydraulic fracturing fluid through a wellbore into a subterranean formation at a pressure greater than a fracturing pressure of the subterranean formation. The hydraulic fracturing fluid may include an aqueous base fluid and a clay stabilizer consisting of one or more polyethylene polyamines having a first structure $H_2NCH_2CH_2(NHCH_2CH_2)_xNH_2$, where x is an integer greater than or equal to 3. The amount of the clay stabilizer may be from 1 $lb_m$/bbl to 20 $lb_m$/bbl relative to the total volume of the hydraulic fracturing fluid. The average molecular weight of the polyethylene polyamines in the hydraulic fracturing fluid having the first chemical structure may be from 200 g/mol to 400 g/mol. All of the polyethylene polyamines in the hydraulic fracturing fluid having the first chemical structure may be encompassed in the clay stabilizer.

18 Claims, 1 Drawing Sheet

(51) Int. Cl.
*C09K 8/68* (2006.01)
*E21B 43/26* (2006.01)

(56) References Cited

U.S. PATENT DOCUMENTS

| | | | |
|---|---|---|---|
| 4,493,771 A | 1/1985 | Wilson et al. | |
| 4,515,708 A | 5/1985 | Haslegrave et al. | |
| 5,057,467 A | 10/1991 | Croft | |
| 5,558,171 A | 9/1996 | McGlothlin et al. | |
| 5,593,953 A | 1/1997 | Malchow, Jr. | |
| 5,641,385 A | 6/1997 | Croft et al. | |
| 5,964,295 A * | 10/1999 | Brown | C09K 8/68 |
| | | | 166/308.2 |
| 6,153,049 A | 11/2000 | Croft | |
| 6,312,560 B1 | 11/2001 | Croft | |
| 7,863,228 B2 | 1/2011 | Loper et al. | |
| 9,434,911 B2 | 9/2016 | Bennett et al. | |
| 9,631,131 B2 | 4/2017 | Witham et al. | |
| 2006/0128571 A1 * | 6/2006 | Loper | C10L 10/06 |
| | | | 508/242 |
| 2009/0131280 A1 | 5/2009 | Federici et al. | |
| 2010/0096130 A1 | 4/2010 | Parlar et al. | |
| 2014/0262319 A1 * | 9/2014 | Treybig | C09K 8/86 |
| | | | 166/371 |
| 2015/0065614 A1 | 3/2015 | Kuo et al. | |
| 2015/0072902 A1 | 3/2015 | Lafitte et al. | |
| 2016/0208158 A1 | 7/2016 | Monahan et al. | |
| 2018/0127557 A1 | 5/2018 | Reddy et al. | |
| 2018/0171198 A1 | 6/2018 | Mack et al. | |
| 2019/0136110 A1 * | 5/2019 | AlBahrani | E21B 21/00 |
| 2020/0071602 A1 * | 3/2020 | Dhawan | C09K 8/594 |
| 2020/0115615 A1 * | 4/2020 | Steves | C09K 8/035 |

OTHER PUBLICATIONS

U.S. Office Action dated Mar. 7, 2022 pertaining to U.S. Appl. No. 17/176,449, filed Feb. 16, 2021, 26 pages.

* cited by examiner

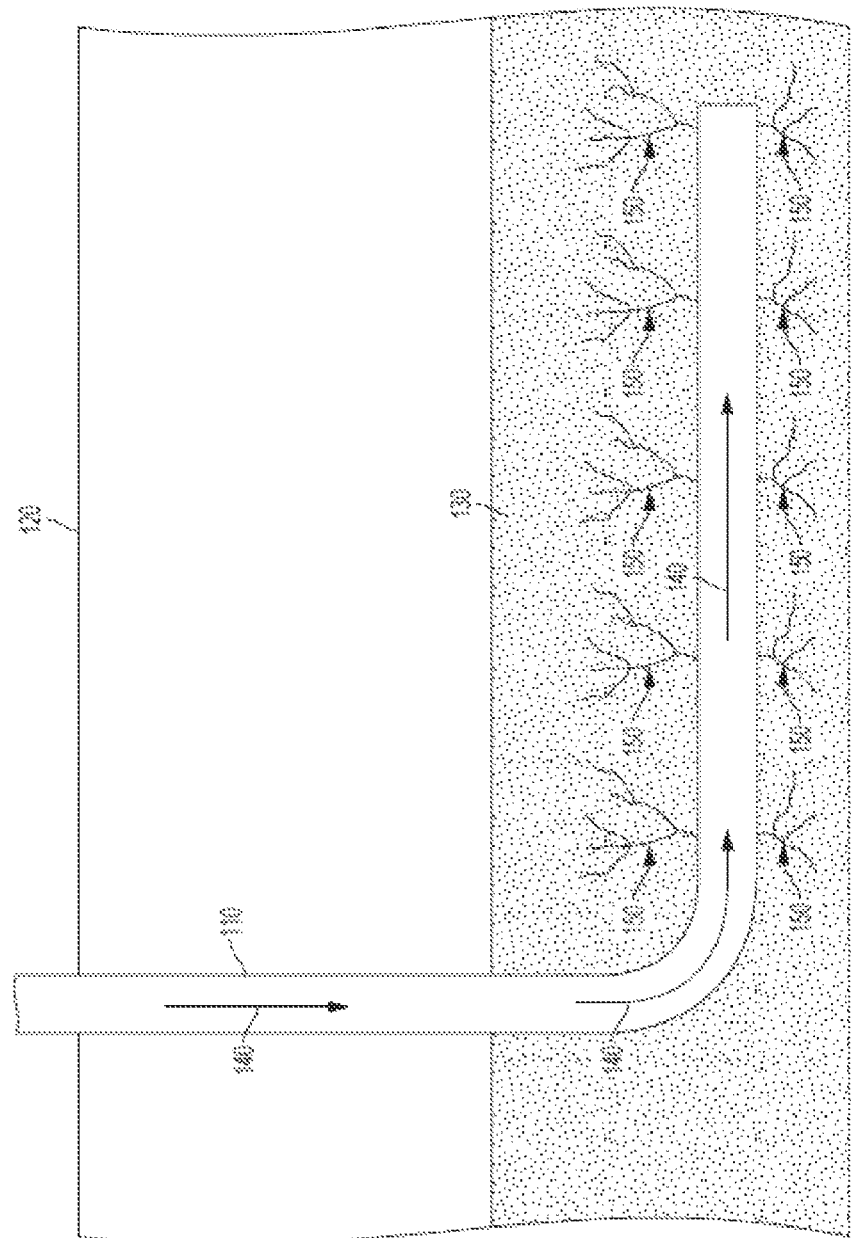

HYDRAULIC FRACTURING FLUIDS WITH AN AQUEOUS BASE FLUID AND CLAY STABILIZER AND METHODS FOR HYDRAULIC FRACTURING USING THE SAME

BACKGROUND

Field

The present disclosure relates to natural resource well drilling and, more specifically, to hydraulic fracturing fluids and methods for hydraulic fracturing.

Technical Background

The discovery and extraction of hydrocarbons, such as oil or natural gas, from subterranean formations, may be impeded for a variety of reasons, such as inherently poor permeability or formation damage. As a result, the production rate of hydrocarbons from hydrocarbon-producing regions of subterranean formations may be reduced compared to expected production rates. In these instances, methods for enhancing recovery from hydrocarbon-producing regions of subterranean formations can be utilized to improve hydrocarbon production. For example, hydraulic fracturing is a stimulation treatment routinely performed to increase the amount of hydrocarbons produced from subterranean formations. During such treatments, hydraulic fracturing fluids are pumped into a subterranean formation, which causes fractures to open in the subterranean formation.

However, subterranean formations that are composed primarily of clay particles, such as shale formations, may become hydrated during treatment when conventional hydraulic fracturing fluids, which are primarily composed of water, are used. When exposed to a conventional hydraulic fracturing fluid, clay particles present in a shale formation may react and swell. This swelling may reduce the permeability of the shale formation and the production of hydrocarbons. This may also lead to the collapse of the wellbore or the disintegration of the shale formation, and an increased concentration of fines in the hydraulic fracturing fluid. As a result, the hydraulic fracturing of shale formations may decrease the hydrocarbons produced rather than increase, as intended. Conventional hydraulic fracturing fluids may include salts, such as sodium chloride or potassium chloride, as clay stabilizers, also referred to as shale inhibitors or swelling inhibitors, to prevent the hydration of shale formations. However, when used in amounts effective to prevent the hydration of shale formations, these salts may negatively affect the quality of the surrounding water and soil in the area.

SUMMARY

Accordingly, there is an ongoing need for improved hydraulic fracturing fluids and methods for hydraulic fracturing. The compositions and methods of the present disclosure include a hydraulic fracturing fluid that includes a clay stabilizer consisting of one or more polyethylene polyamines. The chemical structure of the polyethylene polyamines may facilitate the adsorption of the polyethylene polyamines onto the surface of clay particles present in shale formations during hydraulic fracturing. The adsorption of the polyethylene polyamines onto the surface of the clay particles may reduce or prevent interactions between the clay particles and the aqueous base fluid of the hydraulic fracturing fluid. This reduction or prevention of interaction may, in turn, reduce or prevent the hydration of the shale formation. As a result, the hydraulic fracturing fluid of the present disclosure may increase the efficiency of the hydraulic fracturing of shale formations while also avoiding the negative environmental effects of excessive salt concentrations when compared to some conventional hydraulic fracturing fluids.

According to one or more embodiments of the present disclosure, a hydraulic fracturing fluid includes an aqueous base fluid and a clay stabilizer consisting of one or more polyethylene polyamines having a first structure $H_2NCH_2CH_2(NHCH_2CH_2)_xNH_2$, where x is an integer greater than or equal to 3. The amount of the clay stabilizer may be from 1 pound per barrel ($lb_m$/bbl) to 20 $lb_m$/bbl relative to the total volume of the hydraulic fracturing fluid. The average molecular weight of the polyethylene polyamines in the hydraulic fracturing fluid having the first chemical structure may be from 200 grams per mole (g/mol) to 400 g/mol. All of the polyethylene polyamines in the hydraulic fracturing fluid having the first chemical structure may be encompassed in the clay stabilizer.

According to one or more embodiments of the present disclosure, a method for hydraulic fracturing includes pumping a hydraulic fracturing fluid through a wellbore into a subterranean formation at a pressure greater than a fracturing pressure of the subterranean formation. The hydraulic fracturing fluid may include an aqueous base fluid and a clay stabilizer consisting of one or more polyethylene polyamines having a first structure $H_2NCH_2CH_2(NHCH_2CH_2)_xNH_2$, where x is an integer greater than or equal to 3. The amount of the clay stabilizer may be from 1 $lb_m$/bbl to 20 $lb_m$/bbl relative to the total volume of the hydraulic fracturing fluid. The average molecular weight of the polyethylene polyamines in the hydraulic fracturing fluid having the first chemical structure may be from 200 g/mol to 400 g/mol. All of the polyethylene polyamines in the hydraulic fracturing fluid having the first chemical structure are encompassed in the clay stabilizer.

Additional features and advantages of the aspects of the present disclosure will be set forth in the detailed description that follows and, in part, will be readily apparent to a person of ordinary skill in the art from the detailed description or recognized by practicing the aspects of the present disclosure.

BRIEF DESCRIPTION OF THE DRAWINGS

The following detailed description of the present disclosure may be better understood when read in conjunction with the following drawing in which:

FIG. 1 schematically depicts a wellbore for hydraulic fracturing, according to one or more aspects of the present disclosure.

Reference will now be made in greater detail to various aspects, some of which are illustrated in the accompanying drawings.

DETAILED DESCRIPTION

The present disclosure is directed to hydraulic fracturing fluids and, additionally, to methods for hydraulic fracturing using such hydraulic fracturing fluids. A subterranean formation is the fundamental unit of lithostratigraphy. As used in the present disclosure, the term "subterranean formation" may refer to a body of rock that is sufficiently distinctive and continuous from the surrounding rock bodies that the body of rock can be mapped as a distinct entity. A subterranean formation may be sufficiently homogenous to form a single identifiable unit containing similar geological properties throughout the subterranean formation, including, but not limited to, porosity and permeability. A single subterranean formation may include different regions, where some regions include hydrocarbons and others do not. To produce hydrocarbons from the hydrocarbon regions of the subterranean formation, production wells are drilled to a depth that enables these hydrocarbons to travel from the subterranean formation to the surface. As used in the present disclosure, the term "wellbore" may refer to the drilled hole or borehole, including the openhole or uncased portion of the well. This initial stage of production is referred to as "primary recovery."

In primary recovery, natural formation energy, such as gasdrive, waterdrive, or gravity drainage, displaces hydrocarbons from the subterranean formation into the wellbore and up to the surface. As used in the present disclosure, the term "wellbore" may refer to the drilled hole or borehole, including the openhole or uncased portion of the well. Initially, the formation pressure may be considerably greater than the downhole pressure inside the wellbore. This differential pressure may drive hydrocarbons toward the wellbore and up to the surface. However, as the formation pressure decreases due to hydrocarbon production, the differential pressure also decreases. The primary recovery stage reaches its limit when the formation pressure is reduced to the point that the hydrocarbon production rates are no longer economical or when the proportions of gas or water in the production stream increase to the point that further primary recovery is no longer economical. During primary recovery, only a minority percentage of the total initial hydrocarbons in the subterranean formation are extracted (typically around 10 percent (%) by volume for hydrocarbon-containing subterranean formations).

During a second recovery stage of hydrocarbon production, an external fluid such as water or gas may be injected into the subterranean formation through injection wells positioned in rock that is in fluid communication with production wells. As used in the present disclosure, the term "injection well" may refer to a well in which fluids are injected into the subterranean formation rather than produced from the subterranean formation. Secondary recovery may operate to maintain formation pressure and to displace hydrocarbons toward the wellbore. The secondary recovery stage reaches its limit when the injected fluid (water or gas) is produced from the production well in amounts sufficient such that the production of hydrocarbons is no longer economical. The successive use of primary recovery and secondary recovery in a hydrocarbon-producing subterranean formation produces, on average, 15% to 40% by volume of the original hydrocarbons in place. This indicates that a significant amount of hydrocarbons remains in the subterranean formation after primary and secondary recovery.

Hydraulic fracturing is a stimulation treatment routinely performed to increase the amount of hydrocarbons produced from a subterranean formation. During such treatments, hydraulic fracturing fluids are pumped into the subterranean formation, which causes fractures to open in the subterranean formation. However, as stated previously, subterranean formations that are composed primarily of clay particles, such as shale formations, may become hydrated during treatment when conventional hydraulic fracturing fluids, which are primarily composed of water, are used. When exposed to a conventional hydraulic fracturing fluid, clay particles present in a shale formation may react and swell. This swelling may reduce the permeability of the shale formation and the production of hydrocarbons. This may also lead to the collapse of the wellbore or the disintegration of the shale formation, and an increased concentration of fines in the hydraulic fracturing fluid. As a result, the hydraulic fracturing of shale formations may decrease the hydrocarbons produced rather than increase, as intended.

In one or more embodiments, the present disclosure is directed to hydraulic fracturing fluids that include an aqueous base fluid and a clay stabilizer consisting of one or more polyethylene polyamines having a first structure $H_2NCH_2CH_2(NHCH_2CH_2)_xNH_2$, where x is an integer greater than or equal to 3. The amount of hydration inhibitor may be from 1 $lb_m$/bbl to 20 $lb_m$/bbl relative to the total volume of the hydraulic fracturing fluid. The average molecular weight of the polyethylene polyamines in the hydraulic fracturing fluid comprising the first chemical structure may be from 200 g/mol to 400 g/mol. All of the polyethylene polyamines in the hydraulic fracturing fluid comprising the first chemical structure may be encompassed in the clay stabilizer. The hydraulic fracturing fluid of the present disclosure may reduce or prevent the hydration of shale formations. The structure of the polyethylene polyamines of the hydraulic fracturing fluid may facilitate the adsorption of the polyethylene polyamines onto the surface of clay particles present in shale formations during hydraulic fracturing. The adsorption of the polyethylene polyamines onto the surface of clay particles may reduce or prevent interactions between clay particles and the aqueous base fluid of the hydraulic fracturing fluid. This reduction or prevention of interaction may, in turn, reduce or prevent the hydration of shale formations. As a result, the hydraulic fracturing fluid of the present disclosure may increase the efficiency of the hydraulic fracturing of shale formations.

In one or more embodiments, the hydraulic fracturing fluid includes an aqueous base fluid. As used in the present disclosure, the term "aqueous" may refer to a fluid or solution that includes water as the major constituent. In some embodiments, the aqueous base fluid may include at least one of fresh water, salt water, brine, municipal water, formation water, produced water, well water, filtered water, distilled water, seawater, or combinations of these. The brine may include at least one of natural and synthetic brine, such as saturated brine or formate brine. Without being bound by any particular theory, it is believed that brine may be used to create osmotic balance between the hydraulic fracturing fluid and the subterranean formation.

In one or more embodiments, the aqueous base fluid includes water containing organic compounds or salt. Without being bound by any particular theory, salt or other organic compounds may be incorporated into the aqueous base fluid to control the density of the hydraulic fracturing fluid. Increasing the saturation of the aqueous base fluid by increasing the salt concentration or the level of other organic compounds in the aqueous base fluid may increase the density of the hydraulic fracturing fluid. Suitable salts include but are not limited to alkali metal chlorides, hydroxides, or carboxylates. For example, in embodiments the aqueous base fluid may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, or combinations of these.

In one or more embodiments, the hydraulic fracturing fluid includes an aqueous base fluid in an amount of from 50 lb$_m$/bbl to 340 lb$_m$/bbl relative to the total volume of the hydraulic fracturing fluid. For example, the hydraulic fracturing fluid may include an aqueous base fluid in an amount of from 50 lb$_m$/bbl to 300 lb$_m$/bbl, from 50 lb$_m$/bbl to 250 lb$_m$/bbl, from 50 lb$_m$/bbl to 200 lb$_m$/bbl, from 50 lb$_m$/bbl to 150 lb$_m$/bbl, from 50 lb$_m$/bbl to 100 lb$_m$/bbl, from 100 lb$_m$/bbl to 340 lb$_m$/bbl, from 100 lb$_m$/bbl to 300 lb$_m$/bbl, from 100 lb$_m$/bbl to 250 lb$_m$/bbl, from 100 lb$_m$/bbl to 200 lb$_m$/bbl, from 100 lb$_m$/bbl to 150 lb$_m$/bbl, from 150 lb$_m$/bbl to 340 lb$_m$/bbl, from 150 lb$_m$/bbl to 300 lb$_m$/bbl, from 150 lb$_m$/bbl to 250 lb$_m$/bbl, from 150 lb$_m$/bbl to 200 lb$_m$/bbl, from 200 lb$_m$/bbl to 340 lb$_m$/bbl, from 200 lb$_m$/bbl to 300 lb$_m$/bbl, from 200 lb$_m$/bbl to 250 lb$_m$/bbl, from 250 lb$_m$/bbl to 340 lb$_m$/bbl, from 250 lb$_m$/bbl to 300 lb$_m$/bbl, or from 300 lb$_m$/bbl to 340 lb$_m$/bbl relative to the total volume of the hydraulic fracturing fluid.

In one or more embodiments, the hydraulic fracturing fluid includes one or more proppants. As used in the present disclosure, the term "proppant" refers to particles mixed with hydraulic fracturing fluids to hold fractures open after the pressure generated during hydraulic fracturing is relieved. In addition to naturally occurring sand grains, man-made or specially engineered proppants, such as resin-coated sand, or high-strength ceramic materials, such as sintered bauxite, may also be used. Proppants are carefully sorted for size and sphericity to provide an efficient conduit for production of hydrocarbons from the subterranean formation.

In one or more embodiments, the proppants may be chosen from any type of proppant suitable for use in hydraulic fracturing applications. As previously described, proppants are propping agent particles used in hydraulic fracturing fluids to maintain and hold open fractures during or following hydraulic fracturing. In some embodiments, the proppants include particles of materials, such as oxides, silicates, silica (sand), ceramics, sintered bauxite, plastic, mineral, glass, hollow glass spheres, thermoplastic polymers, thermoset polymers, walnut shells, pits, husks, quartz, aluminum pellets, synthetic organic particles, or combinations of these. In addition, protective and/or hardening coatings, such as resins or epoxy, to modify or customize the density of a selected base proppant may be used. The material of the proppants may be chosen based on the particular application and characteristics desired, such as the depth of the subsurface formation in which the proppants will be used, as proppants with greater mechanical strength are needed at greater lithostatic pressures.

In one or more embodiments, the hydraulic fracturing fluid includes a clay stabilizer. The clay stabilizer may consist of one or more polyethylene polyamines. As presently described, the clay stabilizer may include a substantial portion of or all of the polyethylene polyamines in the hydraulic fracturing fluid into which the clay stabilizer may be incorporated. For example, the clay stabilizer may include greater than or equal to 90 percent (%), greater than or equal to 95%, greater than or equal to 99%, or greater than or equal to 99.9% of the polyethylene polyamines in the hydraulic fracturing fluid into which the clay stabilizer may be incorporated. The clay stabilizer may reduce or prevent the swelling of clay particles present in subterranean formations and the hydration of subterranean formations. Without being bound by any particular theory, it is believed that the polyethylene polyamines are adsorbed onto the surfaces of the clay particles due to intermolecular interactions, such as hydrogen bonding and Van der Waals forces, between the surfaces of the clay particles and the amine moieties of the polyethylene polyamines. This adsorption may create a film or layer of polyethylene polyamines on the surfaces of the clay particles that prevents interactions between clay particles and the aqueous base fluid of the hydraulic fracturing fluid that may cause swelling of the clay particles and the hydration of subterranean formations.

In one or more embodiments, the clay stabilizer may include linear polyethylene polyamines, cyclic polyethylene polyamines, branched polyethylene polyamines, or combinations of these. Generally, the polyethylene polyamines of the clay stabilizer may have the chemical structure of Formula (I):

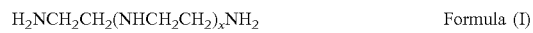

$$H_2NCH_2CH_2(NHCH_2CH_2)_xNH_2 \qquad \text{Formula (I)}$$

In Formula (I), x may be an integer greater than or equal to 3. In embodiments, x may be an integer greater than or equal to 4, greater than or equal to 5, greater than or equal to 6, greater than or equal to 7, greater than or equal to 8, greater than or equal to 9, greater than or equal to 10. In embodiments, x may be an integer from 3 to 10, from 3 to 9, from 3 to 8, from 3 to 7, from 3 to 6, from 3 to 5, from 3 to 4, from 4 to 10, from 4 to 9, from 4 to 8, from 4 to 7, from 4 to 6, from 4 to 5, from 5 to 10, from 5 to 9, from 5 to 8, from 5 to 7, from 5 to 6, from 6 to 10, from 6 to 9, from 6 to 8, from 6 to 7, from 7 to 10, from 7 to 9, from 7 to 8, from 8 to 10, from 8 to 9, or from 9 to 10. The (NHCH2CH$_2$)$_x$ moiety of Formula (I) may include cyclic moieties, branched moieties, or combinations of these. Without being bound by any particular theory, it is believed that a greater number of (NHCH$_2$CH$_2$)$_x$ moieties may result in a greater reduction in the hydration of subterranean formations due to a greater concentration of amine moieties in the hydraulic fracturing fluid that may interact with the surface of the clay particles.

In one or more embodiments, the polyethylene polyamines of the clay stabilizer have an average molecular weight sufficient to create a film or layer on the surfaces of clay particles present in subterranean formations. In some embodiments, the polyethylene polyamines have an average molecular weight of from 200 g/mol to 400 g/mol. For example, the polyethylene polyamines may have an average molecular weight of from 200 g/mol to 375 g/mol, from 200 g/mol to 350 g/mol, from 200 g/mol to 325 g/mol, from 200 g/mol to 300 g/mol, from 200 g/mol to 275 g/mol, from 200 g/mol to 250 g/mol, from 200 g/mol to 225 g/mol, from 225 g/mol to 400 g/mol, from 225 g/mol to 375 g/mol, from 225 g/mol to 350 g/mol, from 225 g/mol to 325 g/mol, from 225 g/mol to 300 g/mol, from 225 g/mol to 275 g/mol, from 225 g/mol to 250 g/mol, from 250 g/mol to 400 g/mol, from 250 g/mol to 375 g/mol, from 250 g/mol to 350 g/mol, from 250 g/mol to 325 g/mol, from 250 g/mol to 300 g/mol, from 250 g/mol to 275 g/mol, from 275 g/mol to 400 g/mol, from 275 g/mol to 375 g/mol, from 275 g/mol to 350 g/mol, from 275 g/mol to 325 g/mol, from 275 g/mol to 300 g/mol, from 300 g/mol to 400 g/mol, from 300 g/mol to 375 g/mol, from 300 g/mol to 350 g/mol, from 300 g/mol to 325 g/mol, from 325 g/mol to 400 g/mol, from 325 g/mol to 375 g/mol, from 325 g/mol to 350 g/mol, from 350 g/mol to 400 g/mol, from 350 g/mol to 375 g/mol, or from 375 g/mol to 400 g/mol. When the polyethylene polyamines have an average molecular weight less than 200 g/mol, the polyethylene polyamines may not create a film or layer over the entire surface of clay particles present in subterranean formations. Without being bound by any particular theory, it is believed that smaller polyethylene polyamines, for example, polyethylene polyamines having an average molecular weight less than 200 g/mol, may not be large enough to adequately cover the entire surface of the clay particles. This may allow interaction between clay particles and the aqueous base fluid of the hydraulic fracturing fluid, which may result in the swelling of clay particles and the hydration of subterranean formations.

In one or more embodiments, the clay stabilizer includes tetraethlyenepentamine, pentaethylenehexamine, hexaethyleneheptamine, or combinations of these. In some embodiments, the weight percent (wt. %) of the tetraethlyenepentamine may be at least 10 wt. % of the clay stabilizer. For example, the weight percent of the tetraethlyenepentamine may be at least 20 wt. %, at least 30 wt. %, at least 40 wt. %, at least 50 wt. %, at least 60 wt. %, at least 70 wt. %, at least 80 wt. %, or at least 90 wt. % of the clay stabilizer. In some embodiments, the weight percent of the pentaethylenehexamine may be at least 10 wt. % of the clay stabilizer. For example, the weight percent of the pentaethylenehexamine may be at least 20 wt. %, at least 30 wt. %, at least 40 wt. %, at least 50 wt. %, at least 60 wt. %, at least 70 wt. %, at least 80 wt. %, or at least 90 wt. % of the clay stabilizer. In some embodiments, the weight percent of the hexaethyleneheptamine may be at least 10 wt. % of the clay stabilizer. For example, the weight percent of the hexaethyleneheptamine may be at least 20 wt. %, at least 30 wt. %, at least 40 wt. %, at least 50 wt. %, at least 60 wt. %, at least 70 wt. %, at least 80 wt. %, or at least 90 wt. % of the clay stabilizer. In some embodiments, tetraethlyenepentamine, pentaethylenehexamine, hexaethyleneheptamine, or combinations of these, may be the majority of the clay stabilizer. In embodiments, the sum of the weight percent of the tetraethlyenepentamine, pentaethylenehexamine, and hexaethyleneheptamine may be at least 50 wt. % of the clay stabilizer. For example, the sum of the weight percent of the tetraethlyenepentamine, pentaethylenehexamine, and hexaethyleneheptamine may be at least 60 wt. %, at least 70 wt. %, at least 80 wt. %, at least 90 wt. %, at least 95 wt. %, or at least 99 wt. % of the clay stabilizer.

In one or more embodiments, the hydraulic fracturing fluid includes the clay stabilizer in an amount sufficient to effectively reduce or prevent the hydration of subterranean formations. In some embodiments, the hydraulic fracturing fluid includes the clay stabilizer in an amount of from 1 $lb_m$/bbl to 20 $lb_m$/bbl relative to the total volume of the hydraulic fracturing fluid. For example, the hydraulic fracturing fluid may include the clay stabilizer in an amount of from 1 $lb_m$/bbl to 16 $lb_m$/bbl, from 1 $lb_m$/bbl to 12 $lb_m$/bbl, from 1 $lb_m$/bbl to 8 $lb_m$/bbl, from 1 $lb_m$/bbl to 4 $lb_m$/bbl, from 4 $lb_m$/bbl to 20 $lb_m$/bbl, from 4 $lb_m$/bbl to 16 $lb_m$/bbl, from 4 $lb_m$/bbl to 12 $lb_m$/bbl, from 4 $lb_m$/bbl to 8 $lb_m$/bbl, from 8 $lb_m$/bbl to 20 $lb_m$/bbl, from 8 $lb_m$/bbl to 16 $lb_m$/bbl, from 8 $lb_m$/bbl to 12 $lb_m$/bbl, from 12 $lb_m$/bbl to 20 $lb_m$/bbl, from 12 $lb_m$/bbl to 16 $lb_m$/bbl, or from 16 $lb_m$/bbl to 20 $lb_m$/bbl relative to the total volume of the hydraulic fracturing fluid.

As stated previously in the present disclosure, the hydration of the subterranean formation may lead to an increase in fines in hydraulic fracturing fluids, which may negatively affect rheology. Accordingly, without being bound by any particular theory, it is believed that the effectiveness of a hydraulic fracturing fluid at suppressing the hydration of subterranean formations may be measured by the rheology of the hydraulic fracturing fluid. The rheological properties of the hydraulic fracturing fluid, such as plastic viscosity, yield point, and gel strength, may be determined from measurements of the viscosity, shear stress, and shear rate of the hydraulic fracturing fluid.

The rheological properties of the hydraulic fracturing fluid may be determined by measuring the shear stress on the hydraulic fracturing fluid at different shear rates. The various shear rates are utilized since hydraulic fracturing fluids behave as a rigid body at lesser shear stresses but flow as a viscous fluid at greater shear stresses. The rheology of the hydraulic fracturing fluid may be characterized by the plastic viscosity (PV) and the yield point (YP), which are parameters from the Bingham plastic rheology model. The plastic viscosity is related to the resistance of a hydraulic fracturing fluid to flow due to mechanical interaction between solids, such as fines, in the hydraulic fracturing fluid. The plastic viscosity represents the viscosity of the hydraulic fracturing fluid extrapolated to infinite shear rate. The plastic viscosity is expressed in centipoise (cP). The plastic viscosity reflects the type and concentration of the solids in the hydraulic fracturing fluid. The plastic viscosity of a hydraulic fracturing fluid may be estimated by measuring the shear stress of the hydraulic fracturing fluid using the a rheometer at spindle speeds of 300 rotations per minute (rpm) and 600 rpm and subtracting the 300 rpm dial reading from the 600 rpm dial reading according to Equation (I):

$$PV \text{ (cP)} = \text{(Dial Reading at 600 rpm)} - \text{(Dial Reading at 300 rpm)} \quad \text{Equation (I)}$$

In one or more embodiments, the hydraulic fracturing fluid has a plastic viscosity of from 1 cP to 25 cP. For example, the hydraulic fracturing fluid may have a plastic viscosity of from 1 cP to 20 cP, from 1 cP to 15 cP, from 1 cP to 10 cP, from 1 cP to 5 cP, from 5 cP to 25 cP, from 5 cP to 20 cP, from 5 cP to 15 cP, from 5 cP to 10 cP, from 10 cP to 25 cP, from 10 cP to 20 cP, from 10 cP to 15 cP, from 15 cP to 25 cP, from 15 cP to 20 cP, or from 20 cP to 25 cP. In some embodiments, the clay stabilizer decreases the plastic viscosity of the hydraulic fracturing fluid when compared to a similar or equivalent hydraulic fracturing fluid without the clay stabilizer by greater than or equal to 10%. For example, the clay stabilizer may decrease the plastic viscosity of the hydraulic fracturing fluid when compared to a similar or equivalent hydraulic fracturing fluid without the clay stabilizer by greater than or equal to 20%, greater than or equal to 30%, greater than or equal to 40%, greater than or equal to 50%, greater than or equal to 60%, greater than or equal to 70%, greater than or equal to 80%, greater than or equal to 90%, greater than or equal to 100%, greater than or equal to 200%, greater than or equal to 250%, or greater than or equal to 500%.

Hydraulic fracturing fluids may behave as a rigid body when the shear stress is less than the yield point, and hydraulic fracturing fluids may flow as a viscous fluid when the shear stress is greater than the yield point. In other words, the yield point represents the amount of stress required to move the hydraulic fracturing fluid from a static condition. The yield point of a hydraulic fracturing fluid is expressed as a force per area, such as pounds per one hundred square feet ($lb_f/100 \text{ ft}^2$). Yield point provides an indication of the ability of a hydraulic fracturing fluid to carry solids, such as proppants. The yield point of a hydraulic fracturing fluid is determined by extrapolating the Bingham plastic rheology model to a shear rate of zero. The yield point of a hydraulic fracturing fluid may be estimated from the plastic viscosity of the hydraulic fracturing fluid (as measured in accordance with Equation 2, as previously described) according to Equation (II):

$$YP = \text{(Dial Reading at 300 rpm)} - PV \quad \text{Equation (II)}$$

In one or more embodiments, the hydraulic fracturing fluid has a yield point of from 1 $lb_f/100 \text{ ft}^2$ to 25 $lb_f/100 \text{ ft}^2$. For example, the hydraulic fracturing fluid may have a yield point of from 1 $lb_f/100 \text{ ft}^2$ to 20 $lb_f/100 \text{ ft}^2$, from 1 $lb_f/100$ ft$^2$ to 15 lb$_f$/100 ft$^2$, from 1 lb$_f$/100 ft$^2$ to 10 lb$_f$/100 ft$^2$, from 1 lb$_f$/100 ft$^2$ to 5 lb$_f$/100 ft$^2$, from 5 lb$_f$/100 ft$^2$ to 25 lb$_f$/100 ft$^2$, from 5 lb$_f$/100 ft$^2$ to 20 lb$_f$/100 ft$^2$, from 5 lb$_f$/100 ft$^2$ to 15 lb$_f$/100 ft$^2$, from 5 lb$_f$/100 ft$^2$ to 10 lb$_f$/100 ft$^2$, from 10 lb$_f$/100 ft$^2$ to 25 lb$_f$/100 ft$^2$, from 10 lb$_f$/100 ft$^2$ to 20 lb$_f$/100 ft$^2$, from 10 lb$_f$/100 ft$^2$ to 15 lb$_f$/100 ft$^2$, from 15 lb$_f$/100 ft$^2$ to 25 lb$_f$/100 ft$^2$, from 15 lb$_f$/100 ft$^2$ to 20 lb$_f$/100 ft$^2$, or from 20 lb$_f$/100 ft$^2$ to 25 lb$_f$/100 ft$^2$. In some embodiments, the clay stabilizer may decrease the yield point of hydraulic fracturing fluid when compared to a similar or equivalent hydraulic fracturing fluid without the clay stabilizer by greater than or equal to 10%. For example, the clay stabilizer may decrease the yield point of the hydraulic fracturing fluid when compared to a similar or equivalent hydraulic fracturing fluid without the clay stabilizer by greater than or equal to 20%, greater than or equal to 30%, greater than or equal to 40%, greater than or equal to 50%, greater than or equal to 60%, greater than or equal to 70%, greater than or equal to 80%, greater than or equal to 90%, greater than or equal to 100%, greater than or equal to 200%, greater than or equal to 250%, or greater than or equal to 500%.

The gel strength of a hydraulic fracturing fluid refers to the shear stress of the hydraulic fracturing fluid measured at a shear rate less than 10 rpm following a defined period of time during which the hydraulic fracturing fluid is maintained in a static state. In one or more embodiments, the hydraulic fracturing fluid has a gel strength after 10 seconds of from 1 lb$_f$/100 ft$^2$ to 15 lb$_f$/100 ft$^2$. For example, the hydraulic fracturing fluid may have a gel strength after 10 seconds of from 1 lb$_f$/100 ft$^2$ to 12 lb$_f$/100 ft$^2$, from 1 lb$_f$/100 ft$^2$ to 9 lb$_f$/100 ft$^2$, from 1 lb$_f$/100 ft$^2$ to 6 lb$_f$/100 ft$^2$, from 1 lb$_f$/100 ft$^2$ to 3 lb$_f$/100 ft$^2$, from 3 lb$_f$/100 ft$^2$ to 15 lb$_f$/100 ft$^2$, from 3 lb$_f$/100 ft$^2$ to 12 lb$_f$/100 ft$^2$, from 3 lb$_f$/100 ft$^2$ to 9 lb$_f$/100 ft$^2$, from 3 lb$_f$/100 ft$^2$ to 6 lb$_f$/100 ft$^2$, from 6 lb$_f$/100 ft$^2$ to 15 lb$_f$/100 ft$^2$, from 6 lb$_f$/100 ft$^2$ to 12 lb$_f$/100 ft$^2$, from 6 lb$_f$/100 ft$^2$ to 9 lb$_f$/100 ft$^2$, from 9 lb$_f$/100 ft$^2$ to 15 lb$_f$/100 ft$^2$, from 9 lb$_f$/100 ft$^2$ to 12 lb$_f$/100 ft$^2$, or from 12 lb$_f$/100 ft$^2$ to 15 lb$_f$/100 ft$^2$. In some embodiments, the clay stabilizer may decrease the 10-second gel strength of the hydraulic fracturing fluid when compared to a similar or equivalent hydraulic fracturing fluid without the clay stabilizer by greater than or equal to 10%. For example, the clay stabilizer may decrease the 10-second gel strength of the hydraulic fracturing fluid when compared to a similar or equivalent hydraulic fracturing fluid without the clay stabilizer by greater than or equal to 20%, greater than or equal to 30%, greater than or equal to 40%, greater than or equal to 50%, greater than or equal to 60%, greater than or equal to 70%, greater than or equal to 80%, greater than or equal to 90%, greater than or equal to 100%, greater than or equal to 200%, greater than or equal to 250%, or greater than or equal to 500%.

In one or more embodiments, the hydraulic fracturing fluid has a gel strength after 10 minutes of from 1 lb$_f$/100 ft$^2$ to 25 lb$_f$/100 ft$^2$. For example, the hydraulic fracturing fluid may have a gel strength after 10 minutes of from 1 lb$_f$/100 ft$^2$ to 20 lb$_f$/100 ft$^2$, from 1 lb$_f$/100 ft$^2$ to 15 lb$_f$/100 ft$^2$, from 1 lb$_f$/100 ft$^2$ to 10 lb$_f$/100 ft$^2$, from 1 lb$_f$/100 ft$^2$ to 5 lb$_f$/100 ft$^2$, from 5 lb$_f$/100 ft$^2$ to 25 lb$_f$/100 ft$^2$, from 5 lb$_f$/100 ft$^2$ to 20 lb$_f$/100 ft$^2$, from 5 lb$_f$/100 ft$^2$ to 15 lb$_f$/100 ft$^2$, from 5 lb$_f$/100 ft$^2$ to 10 lb$_f$/100 ft$^2$, from 10 lb$_f$/100 ft$^2$ to 25 lb$_f$/100 ft$^2$, from 10 lb$_f$/100 ft$^2$ to 20 lb$_f$/100 ft$^2$, from 10 lb$_f$/100 ft$^2$ to 15 lb$_f$/100 ft$^2$, from 15 lb$_f$/100 ft$^2$ to 25 lb$_f$/100 ft$^2$, from 15 lb$_f$/100 ft$^2$ to 20 lb$_f$/100 ft$^2$, or from 20 lb$_f$/100 ft$^2$ to 25 lb$_f$/100 ft$^2$. In some embodiments, the clay stabilizer may decrease the 10-minute gel strength of the hydraulic fracturing fluid when compared to a similar or equivalent hydraulic fracturing fluid without the clay stabilizer by greater than or equal to 10%. For example, the clay stabilizer may decrease the 10-minute gel strength of the hydraulic fracturing fluid when compared to a similar or equivalent hydraulic fracturing fluid without the clay stabilizer by greater than or equal to 20%, greater than or equal to 30%, greater than or equal to 40%, greater than or equal to 50%, greater than or equal to 60%, greater than or equal to 70%, greater than or equal to 80%, greater than or equal to 90%, greater than or equal to 100%, greater than or equal to 200%, greater than or equal to 250%, or greater than or equal to 500%.

In one or more embodiments, the water-based drilling fluid may be formulated to have specific characteristics, such as increased viscosity and density. For example, the water-based drilling fluid may be formulated to have viscosity in a range suitable to allow the hydraulic fracturing fluid to be pumped at a sufficient rate while still conveying proppants. To accomplish these functions, the hydraulic fracturing fluid may include one or more additives that are suitable for use in hydraulic fracturing fluids. The one or more additives may include gel stabilizer, crosslinker, or both. As used in the present application, the term "gel stabilizer" refers to materials capable of increasing the stability of the hydraulic fracturing fluid at increased temperatures (that is, temperatures greater than 200° C.). Without being bound by any particular theory, it is believed that gel stabilizers allow hydraulic fracturing fluids to maintain a desired viscosity at temperatures typical of subterranean formations. As used in the present disclosure, the term "crosslinker" refers to materials capable of increasing the viscosity of the hydraulic fracturing fluid. Without being bound by any particular theory, it is believed that crosslinkers react with multiple-strand polymers to couple the molecules, increasing but closely controlling fluid viscosity. Suitable crosslinkers may include, for example, a metallic salt.

In one or more embodiments, the hydraulic fracturing fluid includes one or more additives in an amount of from 0.1 lb$_m$/bbl to 10 lb$_m$/bbl relative to the total volume of the hydraulic fracturing fluid. For example, the hydraulic fracturing fluid may include one or more additives in an amount of from from 0.1 lb$_m$/bbl to 7.5 lb$_m$/bbl, from 0.1 lb$_m$/bbl to 5 lb$_m$/bbl, from 0.1 lb$_m$/bbl to 2.5 lb$_m$/bbl, from 0.1 lb$_m$/bbl to 1 lb$_m$/bbl, from 1 lb$_m$/bbl to 10 lb$_m$/bbl, from 1 lb$_m$/bbl to 7.5 lb$_m$/bbl, from 1 lb$_m$/bbl to 5 lb$_m$/bbl, from 1 lb$_m$/bbl to 2.5 lb$_m$/bbl, from 2.5 lb$_m$/bbl to 10 lb$_m$/bbl, from 2.5 lb$_m$/bbl to 7.5 lb$_m$/bbl, from 2.5 lb$_m$/bbl to 5 lb$_m$/bbl, from 5 lb$_m$/bbl to 10 lb$_m$/bbl, from 5 lb$_m$/bbl to 7.5 lb$_m$/bbl, or from 7.5 lb$_m$/bbl to 10 lb$_m$/bbl relative to the total volume of the hydraulic fracturing fluid.

The present disclosure is also directed to the use of the hydraulic fracturing fluid in treatments, such as hydraulic fracturing. As used in the present disclosure, the term "hydraulic fracturing" refers to a stimulation treatment performed on subterranean formations with a permeability of less than 10 milliDarcys. In one or more embodiments, the method for hydraulic fracturing includes three main stages: a pad fluid stage, a proppant fluid stage, and an overflush fluid stage. In some embodiments, the pad fluid stage includes pumping a pad fluid into a subterranean formation, which initiates and propagates fractures in the subterranean formation. In some embodiments, the proppant fluid stage includes pumping a proppant fluid into the fractures of the formation, which may facilitate the lodging of proppants in the fractures and create conductive fractures through which hydrocarbons flow. In some embodiments, the overflush fluid stage includes pumping an overflush fluid into the fractures to push the proppant inside the fractures. In some embodiments, the pad fluid, the proppant fluid, the overflush fluid, or combinations of these, include the hydraulic fracturing fluid.

In one or more embodiments, the method for hydraulic fracturing includes pumping the hydraulic fracturing fluid through a wellbore into a subterranean formation. Referring now to FIG. 1, a wellbore 110 extends from the surface of the ground 120 into a target subterranean formation 130. In some embodiments, the target subterranean formation 130 is a shale formation. The wellbore 110 may be considered as the primary path in which hydraulic fracturing fluid travels (as indicated by arrows 140 in FIG. 1). The hydraulic fracturing fluid 140 may be introduced into the wellbore 110 at high pressures and flow rates. The pressure and flow rate will vary depending on the type of the target subterranean formation 130. Regardless, the hydraulic fracturing fluid 140 should be introduced into the wellbore 110 at a pressure and flow rate such that the pressure created inside the target subterranean formation 130 is sufficiently greater than the fracturing pressure of target subterranean formation 130 so as to propagate fractures 150, generate fractures 105, or both. As used in the present disclosure, the term "fracturing pressure" refers to a pressure greater than which the injection of fluids will cause the subterranean formation to fracture hydraulically.

In one or more embodiments, the method includes producing hydrocarbons from the subterranean formation. In some embodiments, the method includes increasing a rate of hydrocarbon production from the subterranean formation. In some embodiments, the method includes producing a first rate of hydrocarbon production from the subterranean formation before pumping the hydraulic fracturing fluid, and producing a second rate of hydrocarbon production from the subterranean formation after resuming pumping the hydraulic fracturing fluid, in which the second rate of hydrocarbon production is greater than the first rate of hydrocarbon production. In some embodiments, the second rate of hydrocarbon production is two times greater than the first rate of hydrocarbon production.

In one or more embodiments, proppants within the hydraulic fracturing fluid may aid in treating fractures, to prop open and keep open the fracture. In some embodiments, the method includes producing a first rate of production of hydrocarbons from the subterranean formation, introducing the hydraulic fracturing fluid into the subsurface formation, and increasing hydrocarbon production from the subterranean formation by producing a second rate of production of hydrocarbons from the subterranean formation, in which the second rate of production of hydrocarbons is greater than the first rate of production of hydrocarbons. The rate of hydrocarbon production may increase by at least 5%, 10%, 15%, 20%, 25%, 40%, 50%, 60%, 75%, 100%, 150%, 200%, 250%, or 300%.

EXAMPLES

The various embodiments of hydraulic fracturing fluid will be further clarified by the following examples. The examples are illustrative in nature, and should not be understood to limit the subject matter of the present disclosure.

Example 1—Hydration Suppression Testing

In Example 1, a dispersion test comparing the presently disclosed hydraulic fracturing fluid to conventional hydraulic fracturing fluids was conducted. Specifically, three hydraulic fracturing fluid samples were prepared: a control sample, a sample that included a conventional clay stabilizer (commercially available as Legend™ from Halliburton), and a hydraulic fracturing fluid including the presently disclosed clay stabilizer. The presently disclosed clay stabilizer was a mixture of polyethylene polyamines commercially available as ETHYLENEAMINE E-100 from Huntsman. ETHYLENEAMINE E-100 is a mixture of polyethylene polyamines having an average molecular weight of 250 g/mol to 300 g/mol. Each samples (352 mL) was then mixed with Qusiba shale cuttings (20 g). After mixing, each samples was hot rolled at 66° C. for 16 hours. After hot rolling, the shale cuttings were sieved from the samples and then washed thoroughly with potassium chloride to remove any small shale particles. The shale cuttings were then desiccated at 90° C. before being weighed. The results are reported in Table 1.

TABLE 1

|  | Sample 1 | Sample 2 | Sample 3 |
| --- | --- | --- | --- |
| Composition | | | |
| Water (ml) | 345 | 345 | 345 |
| Polymer (ml) | 5 | 5 | 5 |
| Surfactant (ml) | 0.5 | 0.5 | 0.5 |
| ETHYLENEAMINE E-100 (ml) | 0.5 | — | — |
| Clay Stabilizer (ml) | — | 0.5 | — |
| Gel Stabilizer (ml) | 0.75 | 0.75 | 0.75 |
| Crosslinker (ml) | 0.25 | 0.25 | 0.25 |
| Dispersion Test Results | | | |
| Fresh Shale Cuttings (g) | 20 | 20 | 20 |
| Shale Cuttings After Hot Rolling (g) | 17.850 | 17.188 | 18.402 |

Example 2

To observe the effects of the presently disclosed hydraulic fracturing fluid in reducing or preventing the hydration of shale formations, a hydration suppression test was performed using bentonite clay. As bentonite clay is susceptible to swelling, similar to the clay particles present in a shale formation, the volume of bentonite clay will increase when exposed to a hydraulic fracturing fluid and, as a result, the viscosity of the hydraulic fracturing fluid will increase. Therefore, as stated previously, the ability of a hydraulic fracturing fluid to reduce or prevent the hydration of a subterranean formation may be measured by the rheology of the hydraulic fracturing fluid after exposure to bentonite clay.

In this regard, four different hydraulic fracturing fluid samples were prepared. The first sample (Sample 4) included only 350 grams of water. Samples 5-7 were each prepared by first mixing 350 g of water with 1 g of a clay stabilizer, 5 g of the clay stabilizer, and 10 g of the clay stabilizer, respectively, for 5 minutes. The clay stabilizer incorporated into Samples 5-7 was ETHYLENEAMINE E-100. The resulting samples included the clay stabilizer in concentrations of approximately 1 lb$_m$/bbl (Sample 5), 5 lb$_m$/bbl (Sample 6), and 10 lb$_m$/bbl (Sample 7). Each sample was then mixed with 30 grams of bentonite for 20 minutes. After mixing, the samples were each hot rolled at 150° F. for 16 hours. After hot rolling, the rheology of each sample was measured twice, once at room temperature (RT) and once at 120° F., using a viscometer (commercially available as Model 35 from Fann Instrument Company). The composition and rheology of each sample are listed in Table 2.

TABLE 2

|  | Sample 4 | | Sample 5 | | Sample 6 | | Sample 7 | |
|---|---|---|---|---|---|---|---|---|
| Composition | | | | | | | | |
| Water (g) | 350 | | 350 | | 350 | | 350 | |
| ETHYLENEAMINE E-100 (g) | — | | 1 | | 5 | | 10 | |
| Bentonite (g) | 30 | | 30 | | 30 | | 30 | |
| Rheology | | | | | | | | |
|  | RT | 120° F. | RT | 120° F. | RT | 120° F. | RT | 120° F. |
| 600 rpm | 112 | 95 | 31 | 24 | 22 | 17 | 20 | 15 |
| 300 rpm | 73 | 67 | 20 | 16 | 12 | 9 | 12 | 10 |
| 200 rpm | 62 | 54 | 15 | 13 | 8 | 7 | 9 | 8 |
| 100 rpm | 44 | 34 | 11 | 9 | 4 | 4 | 7 | 6 |
| 6 rpm | 14 | 12 | 6 | 4 | 3 | 2 | 5 | 4 |
| 3 rpm | 11 | 10 | 4 | 3 | 2 | 1 | 4 | 4 |
| PV (cP) | 39 | 28 | 11 | 8 | 10 | 8 | 8 | 5 |
| YP (lb$_f$/100 ft$^2$) | 34 | 39 | 9 | 8 | 2 | 1 | 4 | 5 |
| 10-Second Gel Strength (lb$_f$/100 ft$^2$) | 13 | 13 | 8 | 4 | 4 | 3 | 5 | 4 |
| 10-Minute Gel Strength (lb$_f$/100 ft$^2$) | 41 | 44 | 12 | 5 | 7 | 7 | 10 | 9 |

As shown by Table 2, hydraulic fracturing fluids that include the clay stabilizer are capable of maintaining a lesser plastic viscosity, yield point, 10-second gel strength, and 10-minute gel strength when compared to a hydraulic fracturing fluid that does not include the clay stabilizer. This indicates that the hydraulic fracturing fluid of the present disclosure may be capable of reducing or preventing the hydration of subterranean formations. In particular, the clay stabilizer prevented the bentonite clay from swelling when in contact with the hydraulic fracturing fluid and, as a result, prevented an increase in rheological properties, such as plastic viscosity, of the hydraulic fracturing fluid.

Example 3

To compare the effects of different mixtures of polyethylene polyamines, a hydration suppression test was performed using bentonite clay, as detailed in Example 2. Samples 8 and 9 were each prepared by first mixing 350 g of water with 1 g of tetraethylenepentamine (commercially available from Huntsman Corporation) and 5 g of tetraethylenepentamine, respectively, for 5 minutes. After mixing, Samples 8 and 9 were each hot rolled at 150° F. for 16 hours. After hot rolling, the rheology of both Samples 8 and 9 was measured twice, once at room temperature (RT) and once at 120° F., using a viscometer (commercially available as Model 35 from Fann Instrument Company). The composition and rheology of both Samples 8 and 9, as well as Sample 5-7 of Example 2 are listed in Table 3.

TABLE 3

|  | Sample 5 | | Sample 6 | | Sample 7 | | Sample 8 | | Sample 9 | |
|---|---|---|---|---|---|---|---|---|---|---|
| Composition | | | | | | | | | | |
| Water (g) | 350 | | 350 | | 350 | | 350 | | 350 | |
| ETHYLENEAMINE E-100 (g) | 1 | | 5 | | 10 | | — | | — | |
| Tetraethylenepentamine (g) | — | | — | | — | | 1 | | 5 | |
| Bentonite (g) | 30 | | 30 | | 30 | | 30 | | 30 | |
| Rheology | | | | | | | | | | |
|  | RT | 120° F. | RT | 120° F. | RT | 120° F. | RT | 120° F. | RT | 120° F. |
| 600 rpm | 31 | 24 | 22 | 17 | 20 | 15 | 34 | 30 | 33 | 29 |
| 300 rpm | 20 | 16 | 12 | 9 | 12 | 10 | 23 | 20 | 18 | 18 |
| 200 rpm | 15 | 13 | 8 | 7 | 9 | 8 | 19 | 15 | 14 | 15 |
| 100 rpm | 11 | 9 | 4 | 4 | 7 | 6 | 14 | 10 | 9 | 11 |
| 6 rpm | 6 | 4 | 3 | 2 | 5 | 4 | 8 | 4 | 3 | 5 |
| 3 rpm | 4 | 3 | 2 | 1 | 4 | 4 | 6 | 2 | 3 | 4 |
| PV | 11 | 8 | 10 | 8 | 8 | 5 | 11 | 10 | 15 | 11 |
| YP | 9 | 8 | 2 | 1 | 4 | 5 | 12 | 10 | 3 | 7 |
| Gel Strength, 10 sec | 8 | 4 | 4 | 3 | 5 | 4 | 6 | 5 | 6 | 7 |
| Gel Strength, 10 min | 12 | 5 | 7 | 7 | 10 | 9 | 6 | 5 | 20 | 40 |

As shown by Table 3, hydraulic fracturing fluids that include a mixture of polyethylene polyamines having an average molecular weight of 250 g/mol to 300g/mol are capable of maintaining a similar or lesser plastic viscosity, yield point, 10-second gel strength, and 10-minute gel strength when compared to a hydraulic fracturing fluid that included only tetraethylenepentamine. This indicates that hydraulic fracturing fluids that include mixtures of polyethylene polyamines having a greater average molecular weight when compared to other mixtures of polyethylene polyamines are capable of a greater reduction of the hydration of subterranean formations.

It will be apparent to persons of ordinary skill in the art that various modifications and variations can be made without departing from the scope of the present disclosure. Since modifications, combinations, sub-combinations, and variations of the disclosed embodiments, which incorporate the spirit and substance of the present disclosure, may occur to persons of ordinary skill in the art, the scope of the present disclosure should be construed to include everything within the scope of the appended claims and their equivalents.

According to a first aspect of the present disclosure, a hydraulic fracturing fluid includes an aqueous base fluid and a clay stabilizer consisting of one or more polyethylene polyamines having a first structure $H_2NCH_2CH_2(NHCH_2CH_2)_xNH_2$, where x is an integer greater than or equal to 3. The amount of the clay stabilizer may be from 1 $lb_m$/bbl to 20 $lb_m$/bbl relative to the total volume of the hydraulic fracturing fluid. The average molecular weight of the polyethylene polyamines in the hydraulic fracturing fluid having the first chemical structure may be from 200 g/mol to 400 g/mol. All of the polyethylene polyamines in the hydraulic fracturing fluid having the first chemical structure may be encompassed in the clay stabilizer.

A second aspect of the present disclosure may include the first aspect, where the hydraulic fracturing fluid includes the aqueous base fluid in an amount of from 50 $lb_m$/bbl to 340 $lb_m$/bbl relative to the total volume of the hydraulic fracturing fluid.

A third aspect of the present disclosure may include either one of the first and second aspects, where the polyethylene polyamines of the mixture include linear polyethylene polyamines, cyclic polyethylene polyamines, branched polyethylene polyamines, or combinations of these.

A fourth aspect of the present disclosure may include any one of the first through third aspects, where the polyethylene polyamines of the mixture include tetraethlyenepentamine, pentaethylenehexamine, hexaethyleneheptamine, or combinations of these.

A fifth aspect of the present disclosure may include the fourth aspect, where the sum of the weight percent of the tetraethylenepentamine, pentaethylenehexamine, and hexaethyleneheptamine is at least 50 wt. % of the polyethylene polyamines of the mixture.

A sixth aspect of the present disclosure may include any one of the first through fifth aspects, the hydraulic fracturing fluid has a plastic viscosity of from 1 cP to 25 cP.

A seventh aspect of the present disclosure may include any one of the first through sixth aspects, where the hydraulic fracturing fluid has a yield point of from 1 $lb_f$/100 ft$^2$ to 25 $lb_f$/100 ft$^2$.

An eighth aspect of the present disclosure may include any one of the first through seventh aspects, where the hydraulic fracturing fluid has a gel strength after 10 seconds of from 1 $lb_f$/100 ft$^2$ to 15 $lb_f$/100 ft$^2$.

A ninth aspect of the present disclosure may include any one of the first through eighth aspects, where the hydraulic fracturing fluid has a gel strength after 10 minutes of from 1 $lb_f$/100 ft$^2$ to 25 $lb_f$/100 ft$^2$.

A tenth aspect of the present disclosure may include any one of the first through ninth aspects, further including one or more additives selected from a group consisting of gel stabilizer and crosslinker.

According to an eleventh aspect of the present disclosure, a method for hydraulic fracturing includes pumping a hydraulic fracturing fluid through a wellbore into a subterranean formation at a pressure greater than a fracturing pressure of the subterranean formation. The hydraulic fracturing fluid may be the hydraulic fracturing fluid of any one of the first through tenth aspects.

A twelfth aspect of the present disclosure may include the eleventh aspect, further including producing hydrocarbons from the subterranean formation.

A thirteenth aspect of the present disclosure may include either one of the eleventh and twelfth aspects, further including increasing a rate of hydrocarbon production from the subterranean formation, in which the rate of hydrocarbon production increases by at least 50%.

A fourteenth aspect of the present disclosure may include any one of the eleventh through thirteenth aspects, further including producing a first rate of hydrocarbon production from the subterranean formation before pumping the hydraulic fracturing fluid, and producing a second rate of hydrocarbon production from the subterranean formation after resuming pumping the hydraulic fracturing fluid. The second rate of hydrocarbon production may be greater than the first rate of hydrocarbon production.

A fifteenth aspect of the present disclosure may include the fourteenth aspect, where the second rate of hydrocarbon production is two times greater than the first rate of hydrocarbon production.

It should now be understood that various aspects of the present disclosure are described and such aspects may be utilized in conjunction with various other aspects.

It is noted that any two quantitative values assigned to a property may constitute a range of that property, and all combinations of ranges formed from all stated quantitative values of a given property are contemplated in this disclosure.

Having described the subject matter of the present disclosure in detail and by reference to specific aspects, it is noted that the various details of such aspects should not be taken to imply that these details are essential components of the aspects. Rather, the appended claims should be taken as the sole representation of the breadth of the present disclosure and the corresponding scope of the various aspects described in the present disclosure.

What is claimed is:

1. A hydraulic fracturing fluid comprising:
   aqueous base fluid that does not comprise salt water, seawater, or brine; and
   a clay stabilizer consisting of one or more polyethylene polyamines selected from the group consisting of tetraethylenepentamine, pentaethylenehexamine, hexaethyleneheptamine, or combinations thereof, wherein:
   the amount of the clay stabilizer is from 1 lbm/bbl to 20 lbm/bbl relative to the total volume of the hydraulic fracturing fluid;
   the average molecular weight of the polyethylene polyamines in the hydraulic fracturing fluid having the first chemical structure is from 200 g/mol to 400 g/mol; and
   all of the polyethylene polyamines in the hydraulic fracturing fluid are encompassed in the clay stabilizer and;
   wherein one or more of:
   the hydraulic fracturing fluid has a plastic viscosity of from 1 cP to 25 cP;
   the hydraulic fracturing fluid has a yield point of from 1 $lb_f$/100 ft$^2$ to 25 $lb_f$/100 ft$^2$;

the hydraulic fracturing fluid has a gel strength after 10 seconds of from 1 lbf/100 ft² to 15 lb$_f$/100 ft²; or the hydraulic fracturing fluid has a gel strength after 10 minutes of from 1 lbf/100 ft² to 25 lb$_f$/100 ft².

2. The hydraulic fracturing fluid of claim 1, wherein the hydraulic fracturing fluid comprises the aqueous base fluid in an amount of from 50 lb$_m$/bbl to 340 lb$_m$/bbl relative to the total volume of the hydraulic fracturing fluid.

3. The hydraulic fracturing fluid of claim 1, wherein the polyethylene polyamines comprise linear polyethylene polyamines, cyclic polyethylene polyamines, branched polyethylene polyamines, or combinations of these.

4. The hydraulic fracturing fluid of claim 1, wherein the hydraulic fracturing fluid has a plastic viscosity of from 1 cP to 25 cP.

5. The hydraulic fracturing fluid of claim 1, wherein the hydraulic fracturing fluid has a yield point of from 1 lb$_f$/100 ft² to 25 lb$_f$/100 ft².

6. The hydraulic fracturing fluid of claim 1, wherein the hydraulic fracturing fluid has a gel strength after 10 seconds of from 1 lb$_f$/100 ft² to 15 lb$_f$/100 ft².

7. The hydraulic fracturing fluid of claim 1, wherein the hydraulic fracturing fluid has a gel strength after 10 minutes of from 1 lb$_f$/100 ft² to 25 lb$_f$/100 ft².

8. The hydraulic fracturing fluid of claim 1, further comprising one or more additives selected from a group consisting of gel stabilizer and crosslinker.

9. The method of claim 1, wherein the hydraulic fracturing fluid further comprises a proppant.

10. A method for hydraulic fracturing, the method comprising:

pumping a hydraulic fracturing fluid through a wellbore into a subterranean formation at a pressure greater than a fracturing pressure of the subterranean formation, where the hydraulic fracturing fluid comprises:

an aqueous base fluid that does not comprise salt water, seawater, or brine; and a clay stabilizer consisting of one or more polyethylene polyamines selected from the group consisting of tetraethylenepentamine, pentaethylenehexamine, hexaethyleneheptamine, or combinations thereof, wherein:

the amount of the clay stabilizer is from 1 lbm/bbl to 20 lbm/bbl relative to the total volume of the hydraulic fracturing fluid;

the average molecular weight of the polyethylene polyamines in the hydraulic fracturing fluid having the first chemical structure is from 200 g/mol to 400 g/mol; and all of the polyethylene polyamines in the hydraulic fracturing fluid are encompassed in the clay stabilizer; and wherein one or more of:

the hydraulic fracturing fluid has a plastic viscosity of from 1 cP to 25 cP;

the hydraulic fracturing fluid has a yield point of from 1 lb$_f$/100 ft² to 25 lbf/100 ft²;

the hydraulic fracturing fluid has a gel strength after 10 seconds of from 1 lb$_f$/100 ft² to 15 lbf/100 ft²; or the hydraulic fracturing fluid has a gel strength after 10 minutes of from 1 lb$_f$/100 ft² to 25 lb$_f$/100 ft².

11. The method of claim 10, further comprising producing hydrocarbons from the subterranean formation.

12. The method of claim 10, further comprising increasing a rate of hydrocarbon production from the subterranean formation, in which the rate of hydrocarbon production increases by at least 50%.

13. The method of claim 10, further comprising:

producing a first rate of hydrocarbon production from the subterranean formation before pumping the hydraulic fracturing fluid; and producing a second rate of hydrocarbon production from the subterranean formation after resuming pumping the hydraulic fracturing fluid, wherein the second rate of hydrocarbon production is greater than the first rate of hydrocarbon production.

14. The method of claim 13, wherein the second rate of hydrocarbon production is two times greater than the first rate of hydrocarbon production.

15. The method of claim 10, wherein the hydraulic fracturing fluid comprises the aqueous base fluid in an amount of from 50 lb$_m$/bbl to 340 lb$_m$/bbl relative to the total volume of the hydraulic fracturing fluid.

16. The method of claim 10, wherein the polyethylene polyamines comprise linear polyethylene polyamines, cyclic polyethylene polyamines, branched polyethylene polyamines, or combinations of these.

17. The method of claim 10, wherein the hydraulic fracturing fluid further comprises one or more additives selected from a group consisting of gel stabilizer and crosslinker.

18. The method of claim 10, wherein the hydraulic fracturing fluid further comprises a proppant.

\* \* \* \* \*